United States Patent
Wolfe et al.

(10) Patent No.: US 8,398,451 B2
(45) Date of Patent: Mar. 19, 2013

(54) TACTILE INPUT INTERACTION

(75) Inventors: Andrew Wolfe, Los Gatos, CA (US); Thomas M. Conte, Atlanta, GA (US)

(73) Assignee: Empire Technology Development, LLC, Wilmington, DE (US)

( * ) Notice: Subject to any disclaimer, the term of this patent is extended or adjusted under 35 U.S.C. 154(b) by 696 days.

(21) Appl. No.: 12/557,827

(22) Filed: Sep. 11, 2009

(65) Prior Publication Data
US 2011/0065354 A1    Mar. 17, 2011

(51) Int. Cl.
A63H 30/00 (2006.01)
A63H 13/02 (2006.01)

(52) U.S. Cl. ......... 446/175; 446/297; 446/336; 446/484

(58) Field of Classification Search .......... 446/175, 446/268, 270–271, 297, 373, 385; 463/1, 463/6, 40–42
See application file for complete search history.

(56) References Cited

U.S. PATENT DOCUMENTS

| | | | | |
|---|---|---|---|---|
| 4,820,236 A | * | 4/1989 | Berliner et al. | 446/369 |
| 5,471,192 A | * | 11/1995 | Dash | 340/384.3 |
| 6,053,797 A | * | 4/2000 | Tsang et al. | 446/297 |
| 6,110,079 A | * | 8/2000 | Luedke et al. | 482/83 |
| 6,435,937 B1 | * | 8/2002 | Naegele | 446/298 |
| 6,695,694 B2 | * | 2/2004 | Ishikawa et al. | 463/7 |
| 7,625,319 B2 | * | 12/2009 | Kang et al. | 482/83 |
| 7,775,884 B1 | * | 8/2010 | McCauley | 463/39 |
| 7,909,749 B2 | * | 3/2011 | Sheedy | 482/148 |
| 2009/0209170 A1 | * | 8/2009 | Richter | 446/297 |
| 2011/0021108 A1 | * | 1/2011 | Le et al. | 446/298 |

* cited by examiner

Primary Examiner — Dmitry Suhol
Assistant Examiner — Alex F. R. P. Rada, II
(74) Attorney, Agent, or Firm — Steven S. Rubin, Esq.; Moritt Hock & Hamroff LLP

(57) ABSTRACT

Interactive devices for detecting, characterizing, and acting upon tactile inputs are disclosed. An example embodiment may include a doll configured to produce audible outputs, visible outputs, and/or movement based at least in part upon its characterization of a tactile input. For example, the doll may characterize a tactile input as a slap, a tickle, a rub, a pinch, etc., and the doll may cry, smile, giggle, or move based upon its characterization of the tactile input.

32 Claims, 6 Drawing Sheets

TACTILE INPUT INTERACTION

BACKGROUND

The present disclosure is directed to tactile inputs and, more particularly, to detecting, characterizing, and/or producing an output in response to various types of inputs associated with physical contact, such as a slap, rub, stroke, tickle, scratch, hug, pinch, and the like.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and, therefore, are not to be considered limiting of its scope, the disclosure will be described with additional specificity and detail through use of the accompanying drawings.

In the drawings.

DETAILED DESCRIPTION

Figure 1:
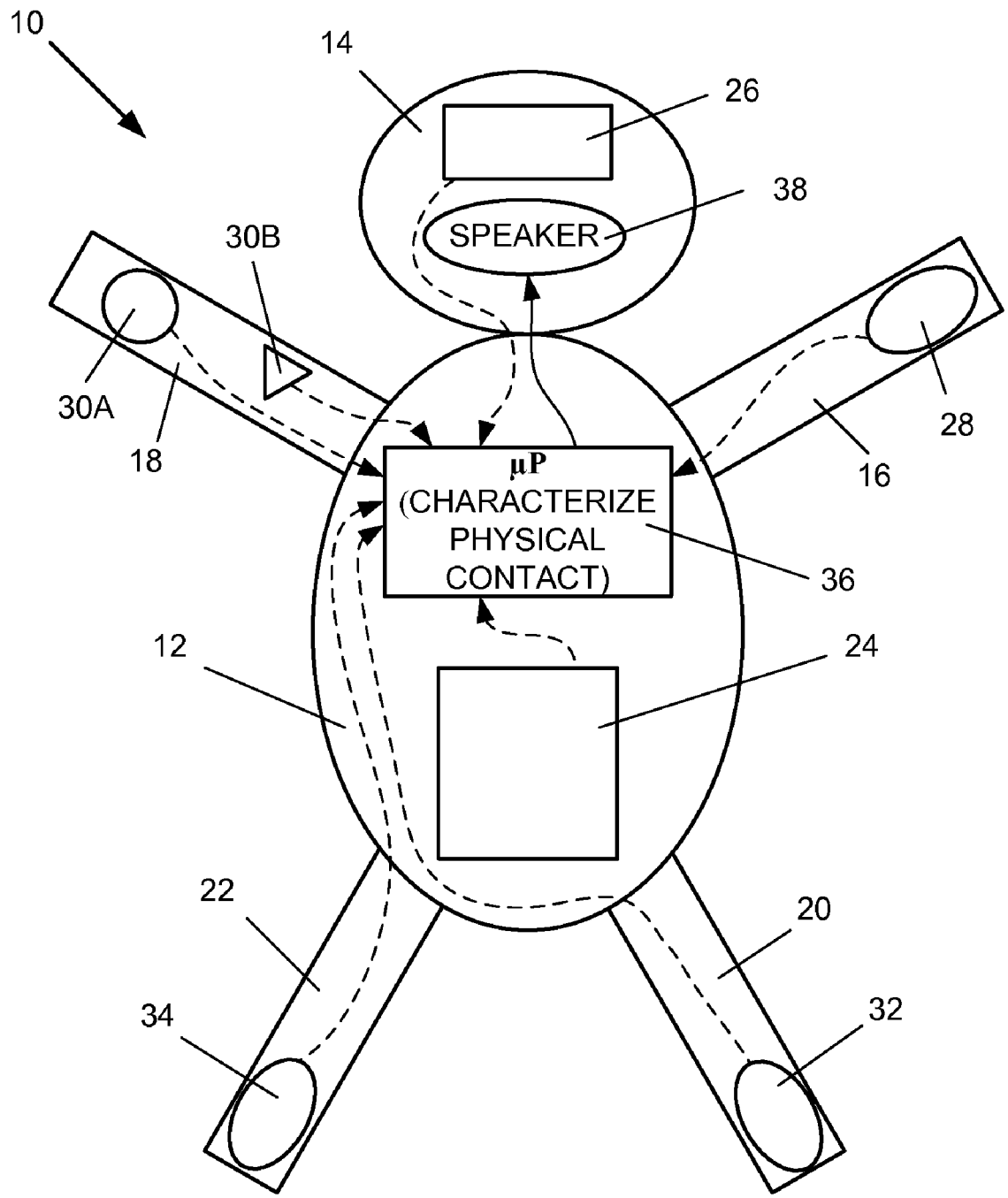
FIG. 1 is schematic diagram of an example embodiment tactile input detection system in a doll.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn, inter alia, to methods and systems related to sensing, characterizing, and/or acting upon physical contact. Some example embodiments may include devices and/or apparatus (such as toys) which may respond differently to different tactile inputs.

The present disclosure contemplates that some devices and/or apparatus, such as toys, may benefit from interaction with users. In some example embodiments, one or more tactile inputs may be sensed and/or characterized, and the type of input may affect the action of an interactive device and/or apparatus. Example tactile inputs may be associated with slaps, rubs, strokes, tickles, scratches, hugs, pinches, and the like, for example. In example embodiments, a variety of measuring devices may be used to detect tactile inputs, including capacitive devices, forces sensors, accelerometers, and the like, for example.

FIG. 1 is a schematic diagram of an example embodiment comprising an interactive toy in the form of a doll 10, which may include one or more sensors 24, 26, 28, 30A, 30B, 32, 34 for sensing one or more tactile inputs. One or more of sensors 24, 26, 28, 30A, 30B, 32, 34 may be mounted to various portions of doll 10, such as body 12, head 14, arms 16, 18, and/or legs 20, 22. One or more of sensors 24, 26, 28, 30A, 30B, 32, 34 may be operatively connected to a logic device, such as microprocessor 36, which may receive information pertaining to the tactile inputs from the sensors 24, 26, 28, 30A, 30B, 32, 34 and/or which may characterize a tactile input based at least in part on the received information. Microprocessor 36 may be operative to direct an output device (such as speaker 38) to produce an output (such as a sound and/or a movement) based at least in part on the characterization of the tactile input.

In some example embodiments, one or more of sensors 24, 26, 28, 30A, 30B, 32, 34 may include one or more capacitive devices, force sensors, accelerometers, and/or any other sensor capable of sensing a tactile input. For example, a sensor 24, 26, 28, 30A, 30B, 32, 34 may include a capacitive touch pad. The size, shape, location, and/or orientation of any of sensors 24, 26, 28, 30A, 30B, 32, 34 may be chosen appropriately for a desired application. For example, a sensor 24 including a relatively large surface area may be located on a belly portion of a doll 10, while smaller sensors 28, 30A may be located on the doll's 10 hand portions. In some example embodiments, one or more sensors 24, 26, 28, 30A, 30B, 32, 34 may be flexible and/or the shape of such a sensor may change over time.

Example outputs may include audible outputs (such as noises, sounds, music, speech, etc.), visible outputs (such as lights, doll eye movement, etc.), movement (such as movement of a dolls arms and/or legs), and/or any other output. An example embodiment in the form of a doll may cry, smile, giggle, move one or more appendages, produce sounds, etc.

In example embodiments, an input gesture received at the surface of the tactile sensor may be characterized or identified by the motion, force, quickness, location, etc. of a gesture. A doll, stuffed animal, or the like, used for playing or training, may include a surface at least partially covered with such a tactile sensor(s), such as a track pad or more an advanced device. The tactile sensor(s) may detect various types of physical contact.

Figure 2:
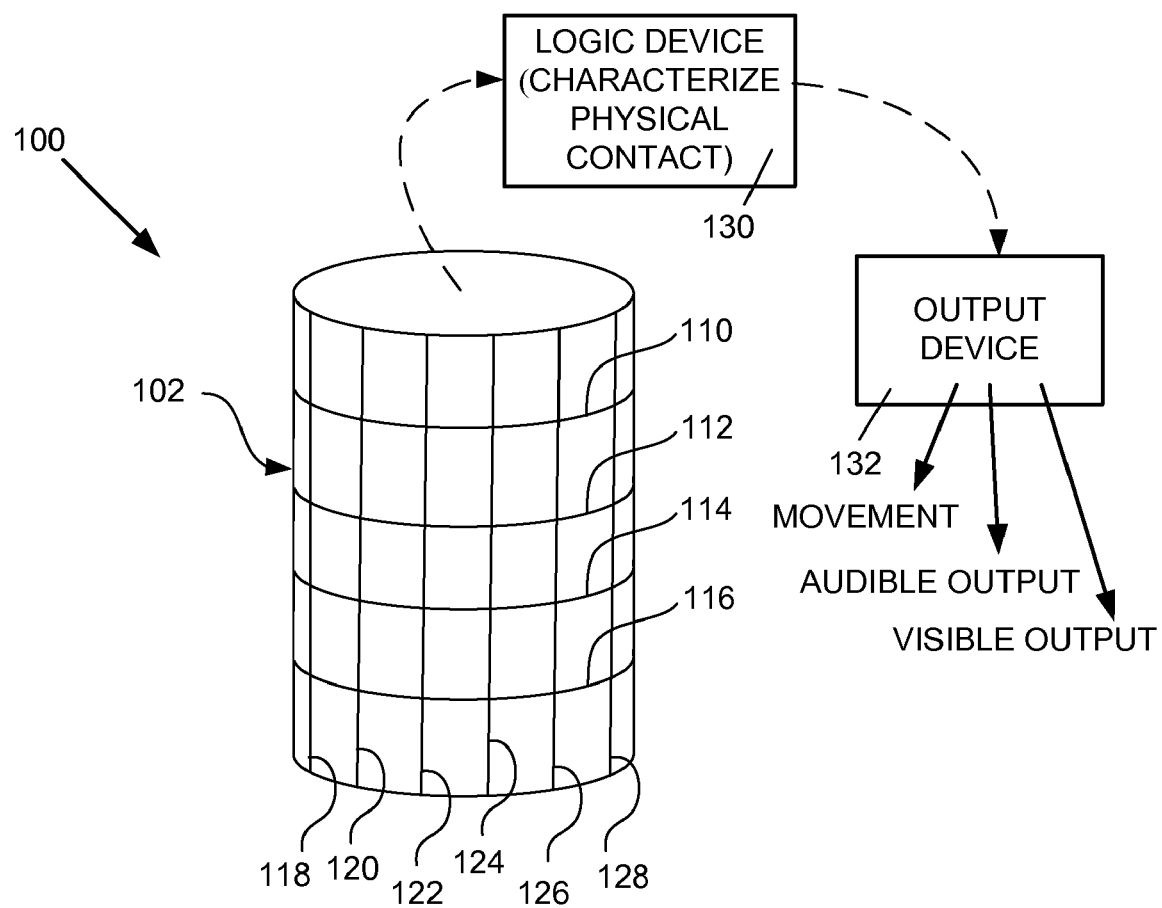
FIG. 2 is a schematic diagram of an example embodiment of a tactile input detection system, including a generally cylindrical capacitive surface type sensor.

FIG. 2 is a perspective view of a cylinder 100 including an example sensor 102. Sensor 102 may comprise a capacitive surface type sensor, which may include conductors arranged in lines. In an example embodiment, the conductors may be arranged as a grid including substantially circumferential bands 110, 112, 114, 116 and/or substantially longitudinal stripes 118, 120, 122, 124, 126, 128, which may be arranged substantially orthogonally (e.g., intersecting at substantially right angles). The capacitances may be received by a logic device 130. The capacitance of each line may be compared to a threshold capacitance to determine where a user is applying a force. The particular location where the force is being applied may be ascertained by identifying which band(s) 110, 112, 114, 116 and which stripe(s) 118, 120, 122, 124, 126, 128 where the capacitance value falls outside a threshold band. In some instances, a force may be applied between bands 110, 112, 114, 116 and/or stripes 118, 120, 122, 124, 126, 128, and logic device 130 may be programmed to perform interpolation to identify the location where the force is being applied. Output device 132 may produce a movement, an audible output, a visible output, and/or another output based at least in part on a characterization of the tactile input received from logic device 130.

In some example embodiments, a grid of conductors for sensing capacitance may be utilized in various two dimensional and three dimensional embodiments. For example, a torso portion of a doll may include a plurality of substantially longitudinal stripes and/or a plurality of substantially circumferential bands which may cooperate to sense a tactile input.

An example logic device may calculate a velocity of a tactile input based at least in part on a change in the location where a force is applied to the sensor. For example, a logic device may calculate a velocity of a tactile input based at least in part on the movement across a sensor of a location of force application. Similarly, in an embodiment including a plurality of sensors, a logic device may calculate a velocity of a tactile input based at least in part on the movement of the tactile input from one sensor to another.

An example logic device may calculate an area of force application based at least in part on the area of the sensor which is subject to the force application. Similarly, in an embodiment including a plurality of sensors, a logic device may calculate an area of force application based at least in part upon the number and/or location of the sensors to which the force is applied.

An example logic device may employ filtering to reduce signal noise. For example, a logic device may disregard signals received from a sensor which are unlikely to be associated with an actual tactile input from a user. For example, a low-pass filter may be used to remove signal noise from a sensor. In some example embodiments, a notch filter may be used to remove signal noise at and/or near a fixed frequency such as 60 Hz. In some example embodiments, certain characteristics of a detected motion may result in rejection of the detected motion. For example, any motion which rapidly changes direction more than once within a time window may be rejected as not being indicative of a gesture.

Figure 3:
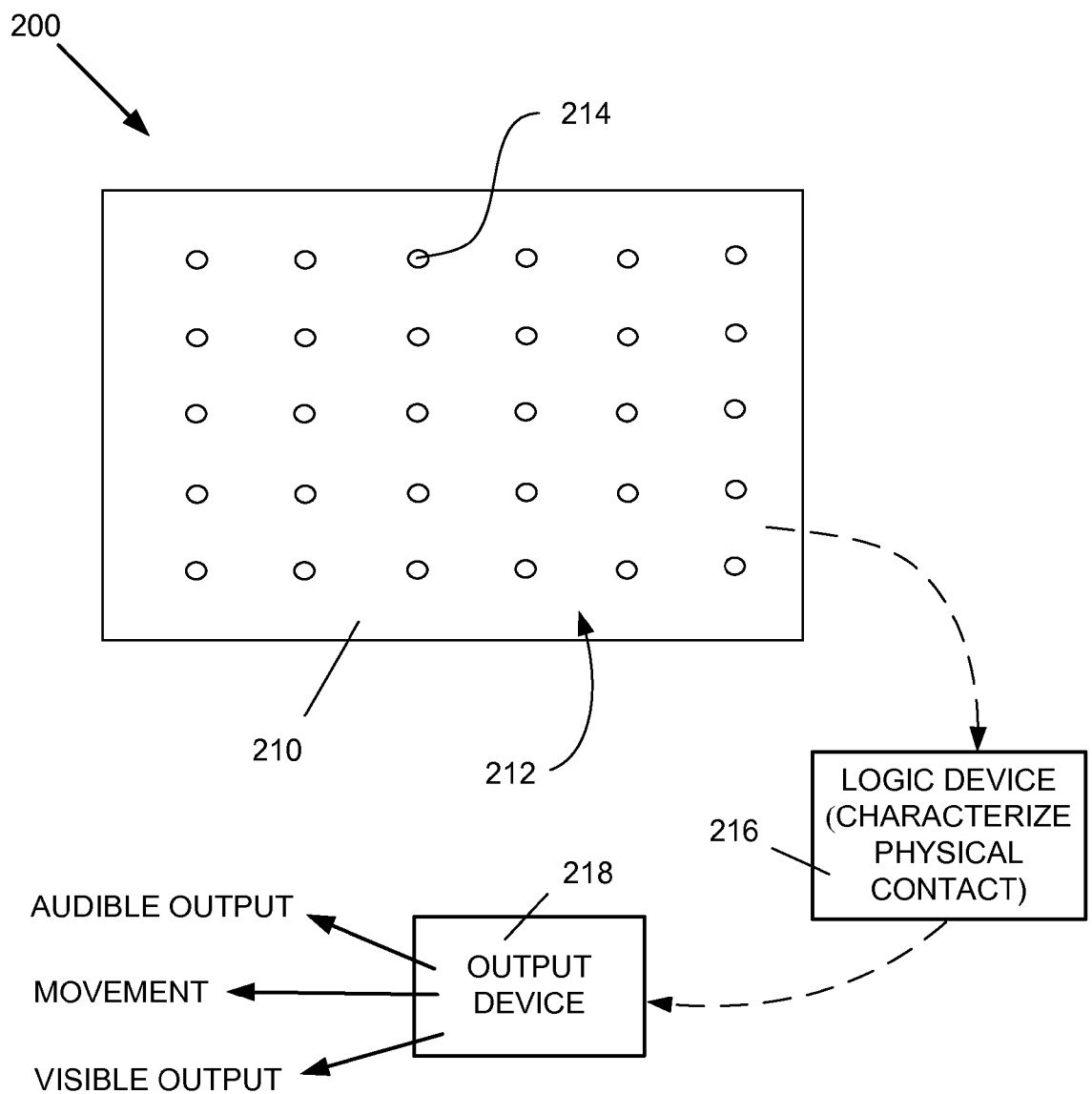
FIG. 3 is a schematic diagram of an example embodiment of a tactile input detection system, including an array of force sensors.

FIG. 3 is a schematic diagram of an example sensor 200 which may comprise an array 212 of force sensors 214. Force sensors 214 may comprise, for example, force sensing resistors and/or microelectromechanical force sensors (such as capacitor and spring force sensors). Logic device 216 may receive data from force sensors 214 and/or may characterize the physical contact. Output device 218 may produce an audible output, a movement, a visible output, and/or another output based at least in part on the characterization of the physical contact by the logic device 216.

Some example embodiments may comprise a toy, such as a toy doll or stuffed animal, that may appear to interact with a user due to the ability to determine a type of tactile input received. For example, the actions of the toy doll or stuffed animal may be based at least in part on the specific type of input received from the user. Other example embodiments include cellular telephones and/or other mobile devices, video game controllers, and/or other devices which may benefit from tactile input detection and characterization.

Some example characterizations of physical contact may include, but are not limited to: a slap, a stroke, a tickle, a scratch, a hug, and/or a pinch. A slap may be characterized by, for example, a gesture that has a force greater than some predetermined threshold. A slap may have only a short duration and may have limited movement, and/or may be localized in a small area. A stroke or rub may be characterized by, for example, a gesture having a force applied between two limits or positions. A stroke or rub may further be characterized by a motion in a fixed direction along the surface. A tickle may be characterized by, for example, a back and forth motion restricted to a limited area, or an oscillatory motion. A scratch may be characterized, for example, in a similar manner to a tickle, but with a greater force. A hug may be characterized by, for example, a pressure over a large region, possibly of varying force. A hug may further be characterized by a gesture having no or limited motion. A pinch may be characterized by, for example, a localized pressure in two substantially adjacent locations.

The present disclosure is not limited to these example characterizations, and it will be understood that many other tactile inputs, gestures, etc. may be sensed and/or characterized. In some example embodiments, characterization information pertaining to various tactile inputs may be stored in the memory of the device. The size, content, and complexity of the stored information may vary depending on the application.

Figure 4:
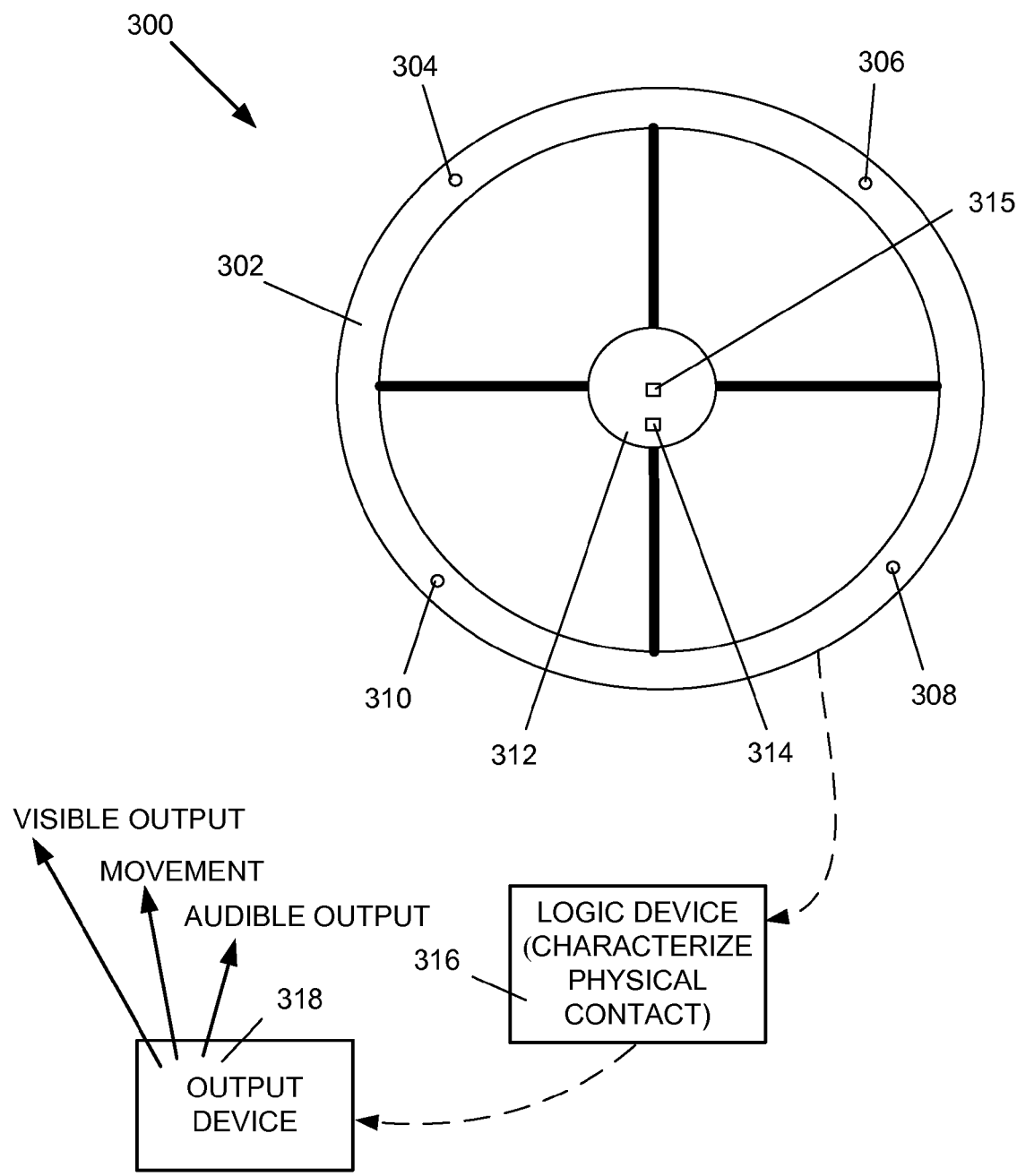
FIG. 4 is a schematic diagram of an example embodiment of a tactile input detection system, including a steering wheel.

FIG. 4 is a schematic diagram of an example embodiment of a tactile input detection system including a steering wheel 300, which may be used as a video game controller. Outer ring 302 may include one or more sensors 304, 306, 308, 310, and/or central portion 312 may include one or more sensors 314, 315. In an example embodiment, sensors 304, 306, 308, 310 may be used to detect the locations where the steering wheel 300 may be gripped by a user and/or the force associated with the user's grip. Sensor 314 may include an accelerometer, which may provide signals enabling calculation of angular position, velocity, and acceleration. Sensor 315 may be a force sensor arranged to detect a force applied to the front face of central portion 312, which may comprise a horn button. Sensors 304, 306, 308, 310, 314, 315 may be operatively connected to a logic device 316, which may be operatively connected to an output device 318. In the context of a steering wheel, logic device 316 may be operative to characterize tactile inputs such as a steering input, a jerk, and/or a "honk." Output device 318 may produce a visible output, a movement, an audible output, and/or another output based at least in part upon the characterization by logic device 316.

In some example embodiments, one or more sensors may be periodically "scanned" to determine whether an input is being applied and, if so, to collect data pertaining to the input. In some example embodiments, a logic device may be in substantially constant communication with one or more sensors. In some example embodiments, which may recognize slower, more gentle gestures, a sampling rate of about 20 samples per second may be adequate. In some example embodiments that recognize a more substantial range of gentle and more vigorous gestures, a sample rate of about 100-1000 samples per second may be appropriate. In some example embodiments, sample rates of less than about 100 samples per second and/or greater than about 1000 samples per second may be employed. In some example embodiments, a higher sampling rate may be used and may be filtered down to a lower sampling rate.

Figure 5:
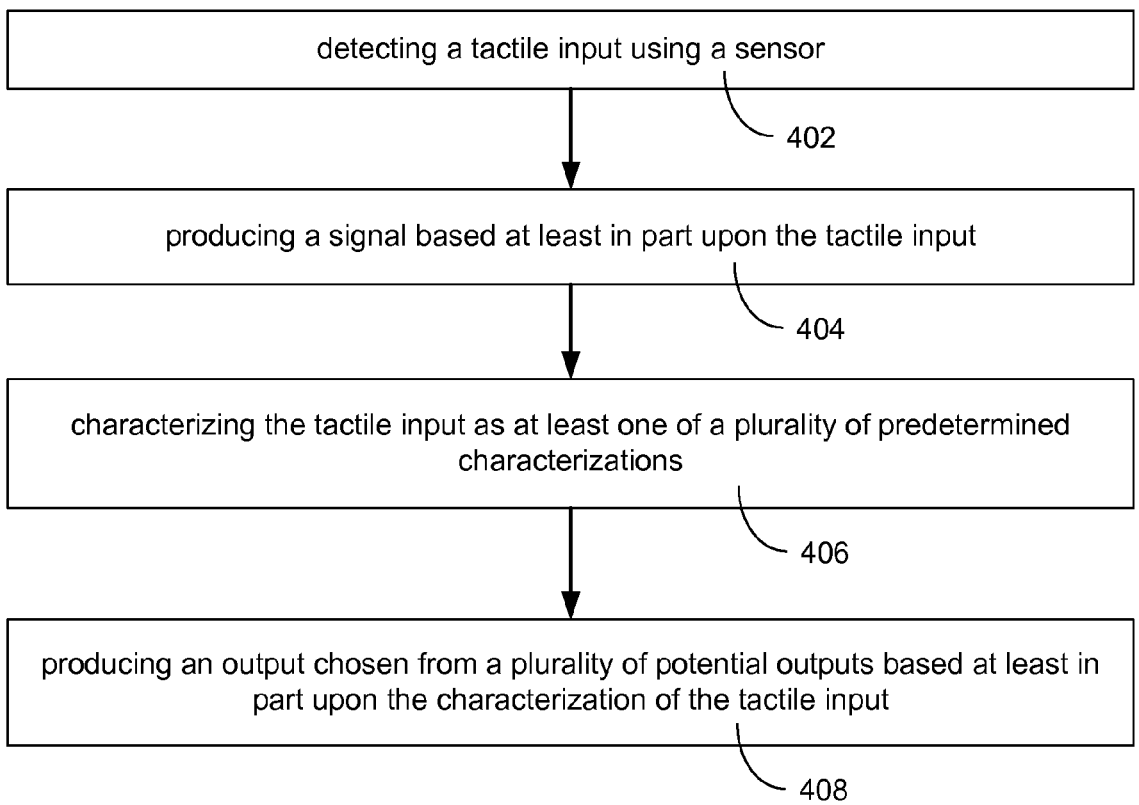
FIG. 5 is a flow chart illustrating an example method of operating an interactive device.

FIG. 5 is a flow chart illustrating an example method of operating an interactive device. Operation 402 may include detecting a tactile input using a sensor. Operation 404 may include producing a signal based at least in part upon the tactile input. Operation 406 may include characterizing the tactile input as at least one of a plurality of predetermined characterizations. Operation 408 may include producing an output chosen from a plurality of potential outputs based at least in part upon the characterization of the tactile input.

Figure 6:
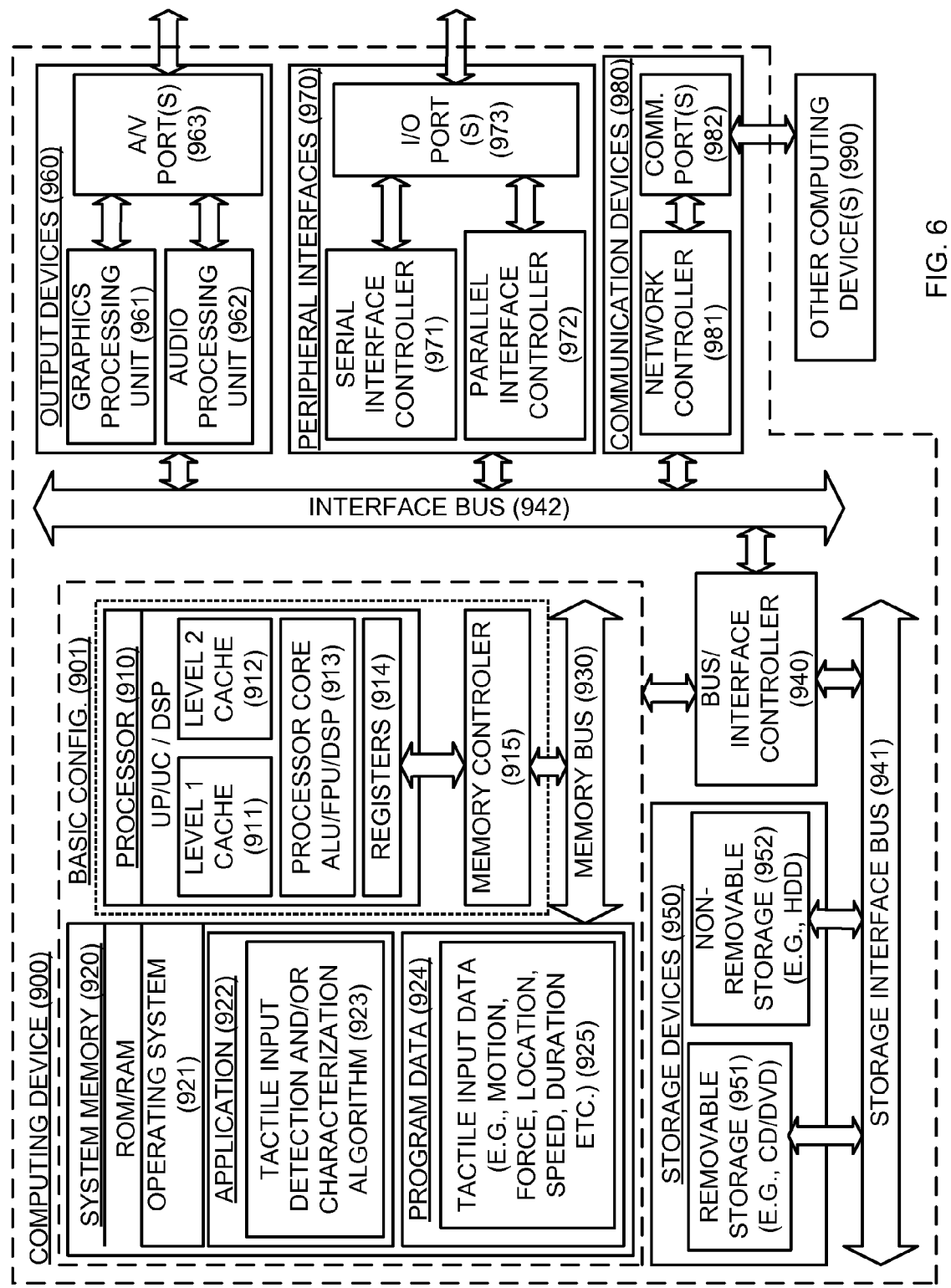
FIG. 6 is a block diagram illustrating an example computing device that may be utilized for tactile input detection, all arranged in accordance with at least some embodiments of the present disclosure.

FIG. 6 is a block diagram illustrating an example computing device 900 that is arranged for tactile input detection in accordance with the present disclosure. In a very basic configuration 901, computing device 900 typically includes one or more processors 910 and system memory 920. A memory bus 930 can be used for communicating between the processor 910 and the system memory 920.

Depending on the desired configuration, processor 910 can be of any type including but not limited to a microprocessor (μP), a microcontroller (μC), a digital signal processor (DSP), or any combination thereof. Processor 910 can include one more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 includes a tactile input detection and/or characterization algorithm 923 that is arranged to detect, characterize, and/or act upon a tactile input. Program Data 924 includes tactile input data 925, such as motion, force, location, speed, duration etc. that is useful for sensing, characterizing, and/or acting upon a tactile input, as will be further described below. In some embodiments, application 922 can be arranged to operate with program data 924 on an operating system 921 such that a tactile input my be sensed, characterized, and/or acted upon. This described basic configuration is illustrated in FIG. 9 by those components within dashed line 901.

Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include an interface bus 942 for facilitating communication from various interface devices (e.g., output interfaces, peripheral interfaces, and communication interfaces) to the basic configuration 901 via the bus/interface controller 940. Example output devices 960 include a graphics processing unit 961 and an audio processing unit 962, which can be configured to communicate to various external devices such as a display or speakers via one or more A/V ports 963. Example peripheral interfaces 970 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication device 980 includes a network controller 981, which can be arranged to facilitate communications with one or more other computing devices 990 over a network communication via one or more communication ports 982. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus adapted to dynamically interact with a user in response to a physical contact, the apparatus comprising:
    a first sensor effective to sense a first magnitude of a first force, and to sense a first location of a physical contact with at least a portion of the apparatus and to produce a first signal in response;
    a second sensor effective to be in operating relationship with the first sensor, the second sensor effective to sense a second magnitude of a second force, and to sense a second location of the physical contact with at least a portion of the apparatus and to produce a second signal in response;
    a logic device configured to:
        periodically scan at a sampling rate the first and second sensors to collect the first and second sensor signals,
        produce a first characterization of the physical contact from the first signal and the sampling rate,
        produce a second characterization of the physical contact from the second signal and the sampling rate, and
        produce a third characterization of the physical contact, different from the first and second characterizations of the physical contact, the third characterization based on the combination of the first and the second signals and the sampling rate; and
    an output device configured to produce an output based at least in part upon the third characterization of the physical contact.

2. The apparatus of claim 1, wherein at least one of the sensors comprises a surface configured to detect a variation in capacitance; and wherein the surface comprises a grid of conductors arranged substantially orthogonally.

3. The apparatus of claim 2, wherein the surface is provided proximate a surface of a doll; and wherein the grid comprises a plurality of substantially longitudinal stripes and a plurality of substantially circumferential bands.

4. The apparatus of claim 2, wherein the logic device is operative to interpolate a location of the physical contact between conductors on the grid based at least in part upon capacitance variation in adjacent conductors in the grid.

5. The apparatus of claim 1, wherein at least one of the sensors comprises an array comprising a plurality of force sensors.

6. The apparatus of claim 5, wherein one or more of the plurality of force sensors comprises a force-sensing resistor.

7. The apparatus of claim 5, wherein one or more of the plurality of force sensors comprises a microelectromechanical force sensor comprising a capacitor and a spring.

8. The apparatus of claim 1, wherein at least one of the sensors comprises one or more accelerometers.

9. The apparatus of claim 8, wherein at least one of the sensors comprises one or more force sensors; and wherein the accelerometer and the force sensor provide individual signals to the logic device.

10. The apparatus of claim 1, wherein at least one of the signals includes information pertaining to one or more of a direction of motion associated with the physical contact, a velocity of motion associated with the physical contact, or an area of force application associated with the physical contact.

11. The apparatus of claim 10, wherein the logic device is operable to characterize the physical contact as a slap; and wherein the slap is associated with a force greater than a predetermined threshold applied for a short duration with limited movement.

12. The apparatus of claim 10, wherein the logic device is operable to characterize the physical contact as a stroke; and wherein the stroke is associated with a force applied in a fixed direction between two limits or positions.

13. The apparatus of claim 10, wherein the logic device is operable to characterize the physical contact as a tickle; and wherein the tickle is associated with a back and forth motion restricted to a limited area with a relatively low force level.

14. The apparatus of claim 10, wherein the logic device is operable to characterize the physical contact as a scratch; and wherein the scratch is associated with a back and forth motion restricted to the limited area with a relatively high force level.

15. The apparatus of claim 10, wherein the logic device is operable to characterize the physical contact as a hug; and wherein the hug is associated with pressure application over a relatively large region.

16. The apparatus of claim 10, wherein the logic device is operable to characterize the physical contact as a pinch; and wherein the pinch is associated with a localized pressure in two substantially adjacent locations.

17. A method for an interactive device to dynamically interact with a user in response to a physical contact, the method for the interactive device comprising:
  detecting a physical contact using a first sensor;
  detecting the physical contact using a second sensor in operational relationship with the first sensor;
  producing a first signal based at least in part upon a first magnitude of a first force and a first location of the physical contact;
  producing a second signal based at least in part upon a second magnitude of a second force and a second location of the physical contact;
  scanning at a sampling rate the first and second sensors to collect the first and second signals,
  characterizing the physical contact, wherein:
    a first characterization of the physical contact is based at least in part on the first signal and the sampling rate,
    a second characterization of the physical contact is based at least in part on the second signal and the sampling rate,
    a third characterization of the physical contact, different from the first and second characterizations of the physical contact, is based at least in part on the combination of the first and second signals and the sampling rate and is one or more of a plurality of predetermined characterizations; and
  producing an output chosen from a plurality of potential outputs based at least in part upon the third characterization of the physical contact.

18. The method of claim 17, wherein characterizing the physical contact comprises filtering at least one of the signals to reduce noise.

19. The method of claim 17, wherein at least one of the sensors comprises one or more force sensors and one or more accelerometers.

20. The method of claim 17, wherein detecting the physical contact comprises detecting acceleration of a steering wheel using the accelerometer; wherein characterizing the physical contact comprises differentiating gradual turning of the steering wheel from rapid turning of the steering wheel; and wherein detecting the physical contact further comprises detecting a force applied to a horn button operatively coupled to the force sensor.

21. The method of claim 17, wherein at least one of the sensors gathers data pertaining to an area over which the physical contact is applied to the interactive device; and wherein at least one of the outputs is based at least in part upon the area over which the physical contact is applied to the interactive device.

22. The method of claim 17, wherein at least one of the outputs comprises one or more of a sound, a visual indication, or a movement.

23. The method of claim 17, wherein detecting the physical contact includes sensing one or more of, a direction of motion associated with the physical contact, a velocity of motion associated with the physical contact, or an area of force application associated with the physical contact.

24. The method of claim 17, wherein the physical contact comprises one or more of a slap associated with a force greater than a predetermined threshold applied for a short duration with limited movement, a stroke associated with a force applied in a fixed direction between two limits or positions, a tickle associated with a back and forth motion restricted to a limited area with a relatively low force level, a scratch associated with a back and forth motion restricted to the limited area with a relatively high force level, a hug associated with pressure application over a relatively large region, or a pinch associated with a localized pressure in two substantially adjacent locations.

25. The method of claim 24, wherein the predetermined characterizations comprise one or more of the slap, the stroke, the tickle, the scratch, the hug, or the pinch.

26. An interactive toy configured to dynamically interact with a user in response to a physical contact, the interactive toy comprising:
  a first tactile input sensor configured to generate a first signal based at least in part on a first magnitude of a first force and a first location of a physical contact with the interactive toy;
  a second tactile input sensor configured to be in operational relationship with the first tactile input sensor, the second tactile input sensor configured to generate a second signal based at least in part on a second magnitude of a second force and a second location of the physical contact with the interactive toy;
  a logic device configured to
    periodically scan at a sampling rate the first and second sensors to collect the first and second sensor signals,
    produce a first characterization of the physical contact from the first signal and the sampling rate,
    produce a second characterization of the physical contact from the second signal and the sampling rate,
    produce a third characterization of the physical contact, different from the first and second characterization of the physical contact, from the combination of the first and the second signal and from the sampling rate, wherein the logic device selects the one or more characterizations of the physical contact from among a plurality of predetermined characterizations; and
  an output device configured to produce one or more outputs based at least in part upon the one or more third characterizations of the physical contact, the output device being operative to produce a plurality of outputs associated with the plurality of predetermined characterizations.

27. The interactive toy of claim 26, wherein at least one of the signals includes data representing one or more of a direction of motion associated with the physical contact, a velocity of motion associated with the physical contact, or an area of force application associated with the physical contact.

28. The interactive toy of claim 26, wherein the plurality of predetermined characterizations comprises one or more of a slap associated with a force greater than a predetermined threshold applied for a short duration with limited movement, a stroke associated with a force applied in a fixed direction between two limits or positions, a tickle associated with a back and forth motion restricted to a limited area with a relatively low force level, a scratch associated with a back and forth motion restricted to the limited area with a relatively high force level, a hug associated with pressure application over a relatively large region, or a pinch associated with a localized pressure in two substantially adjacent locations.

29. The interactive toy of claim 26, wherein the interactive toy is a doll; and wherein the plurality of outputs comprises one or more of a cry, a smile, a giggle, a frown, or a laugh.

30. A non-transitory storage medium comprising machine-readable instructions stored thereon which, when executed by one or more processing units in a device, operatively enable the device to:
- periodically scan at a sampling rate a first sensor to receive a first signal associated with a first magnitude of a first force and a first location of a physical contact detected using the first sensor;
- periodically scan at the sampling rate a second sensor in operating relationship with the first sensor, the second sensor scanned to receive a second signal associated with a second magnitude of a second force and a second location of the physical contact detected by the second sensor;
- produce a first characterization of the physical contact from the first signal and the sampling rate;
- produce a second characterization of the physical contact from the second signal and the sampling rate;
- produce a third characterization of the physical contact, different from the first and second characterizations, from the combination of the first signal and the second signal and based on the sampling rate, the third characterization of the physical contact being one or more of a plurality of predetermined characterizations;
- select an output chosen from a plurality of potential outputs based at least in part upon the third characterization of the physical contact; and
- transmit, to an output device, a third signal associated with the output.

31. The non-transitory storage medium of claim 30, wherein at least one of the first or second signal comprises data pertaining to one or more of a direction of motion associated with the physical contact, a velocity of motion associated with the physical contact, or an area of force application associated with the physical contact; and wherein the machine-readable instructions operatively enable the device to characterize the physical contact as one or more of the plurality of predetermined characterizations based at least in part upon the data.

32. The non-transitory storage medium of claim 31, wherein the plurality of predetermined characterizations comprises one or more of a slap associated with a force greater than a predetermined threshold applied for a short duration with limited movement, a stroke associated with a force applied in a fixed direction between two limits or positions, a tickle associated with a back and forth motion restricted to a limited area with a relatively low force level, a scratch associated with a back and forth motion restricted to the limited area with a relatively high force level, a hug associated with pressure application over a relatively large region, or a pinch associated with a localized pressure in two substantially adjacent locations.

* * * * *